United States Patent
Ganelin (10) Patent No.: US 8,943,472 B1
(45) Date of Patent: Jan. 27, 2015

(54) SYSTEM AND METHOD FOR DIRECTLY ACCESSING SAS DATASETS FROM A JAVA PROGRAM

(71) Applicant: Pavel Ganelin, Rockville, MD (US)

(72) Inventor: Pavel Ganelin, Rockville, MD (US)

(73) Assignee: Dulles Research LLC, Reston, VA (US)

( * ) Notice: Subject to any disclaimer, the term of this patent is extended or adjusted under 35 U.S.C. 154(b) by 0 days.

(21) Appl. No.: 13/902,960

(22) Filed: May 27, 2013

Related U.S. Application Data (63) Continuation-in-part of application No. 12/512,983, filed on Jul. 30, 2009, now Pat. No. 8,453,126.

(60) Provisional application No. 61/084,996, filed on Jul. 30, 2008.

(51) Int. Cl.
  *G06F 9/44* (2006.01)
  *G06F 9/445* (2006.01)

(52) U.S. Cl.
  CPC .................................. *G06F 9/445* (2013.01)
  USPC ........... 717/110; 717/108; 717/116; 717/118; 707/602; 707/705

(58) Field of Classification Search
  None
  See application file for complete search history.

(56) References Cited

U.S. PATENT DOCUMENTS

| | | | |
|---|---|---|---|
| 6,934,946 B2 * | 8/2005 | Sokolov et al. | 718/1 |
| 7,161,925 B2 * | 1/2007 | Wallenius et al. | 370/338 |
| 7,191,097 B1 * | 3/2007 | Lee et al. | 702/183 |
| 7,669,133 B2 * | 2/2010 | Chikirivao et al. | 715/744 |
| 7,685,577 B2 * | 3/2010 | Pace et al. | 717/136 |
| 2002/0184401 A1 * | 12/2002 | Kadel et al. | 709/315 |
| 2005/0102311 A1 * | 5/2005 | Rollins | 707/102 |
| 2005/0273772 A1 * | 12/2005 | Matsakis et al. | 717/136 |
| 2006/0005177 A1 * | 1/2006 | Atkin et al. | 717/151 |
| 2006/0022801 A1 * | 2/2006 | Husak et al. | 340/10.5 |
| 2006/0155720 A1 * | 7/2006 | Feinberg | 707/100 |
| 2006/0179056 A1 * | 8/2006 | Rosenberg | 707/6 |
| 2010/0169124 A1 * | 7/2010 | Underwood et al. | 705/3 |
| 2012/0005654 A1 * | 1/2012 | Graham | 717/120 |
| 2012/0246556 A1 * | 9/2012 | Chikirivao et al. | 715/234 |

* cited by examiner

*Primary Examiner* — Chameli Das
(74) *Attorney, Agent, or Firm* — Whitham, Curtis, Christofferson & Cook, P.C.

(57) ABSTRACT

A system and method for reading and writing datasets (SAS datasets) written in a proprietary runtime macro language (SAS, owned by the SAS Institute, Inc.) directly, without going through a system that uses the SAS proprietary runtime macro language. The system employs a JAVA Database Connectivity (JDBC) application program interface (API) driver usable by JDBC enabled JAVA applications. The driver extracts from the SAS dataset information from a header page that enables identification of information on metadata pages which in turn are used by the driver to present to the JAVA application a view of the data as a database table, from which the JAVA application can request reading and writing of the SAS dataset.

14 Claims, 7 Drawing Sheets

SYSTEM AND METHOD FOR DIRECTLY ACCESSING SAS DATASETS FROM A JAVA PROGRAM

RELATED APPLICATION

This application is a continuation in part from, and claims priority from, U.S. application Ser. No. 12/512,983 having the title "SYSTEM AND METHOD FOR CONVERTING BASE SAS SCRIPTS TO JAVA" and filed on Jul. 30, 2009, which application is hereby incorporated by reference and whose priority derives from U.S. Provisional Application Ser. No. 61/084,996 of the same title filed on Jul. 30, 2008.

BACKGROUND OF THE INVENTION

1. Field of the Invention

The present invention generally relates to techniques for conversion of applications implemented in accordance with a particular set of rules and syntax to another set of rules and syntax, and more particularly to the conversion of such applications written in a script language to a target language such as JAVA and to the access of such converted JAVA applications to datasets produced by the script language.

2. Background Description

The process of converting from one language to another is similar to compiling a program. The difference is that instead of generating machine code (or, more recently, byte code as in JAVA and C++) the converter generates output in a high-level language. Conversion consists of the following steps:

1 Language parsing and syntax tree building.
2 Syntax tree analysis. For traditional compilers this step usually includes machine-independent optimization. For language conversion this step may include modifying the tree to more closely match the target language and type assignment.
3 Code generation; i.e., producing actual output in the target language.
4 Run-time support library to implement.

In the case of compilation, no actual person is expected to be able to read or modify the generated code, so the readability or maintainability of the generated code is not important. For language conversion, on the other hand, it is expected that the generated code will be read and modified later, during code maintenance. Thus the main additional requirement is readability of the generated code.

Language conversion is not always straightforward, and may in some instances it may be very difficult if not impossible to provide a fully automated conversion that retains the functionality of the source language, including the requirements of readability and maintainability. This is most obvious with natural spoken and written languages, where aspects of the grammar and syntax of the source languages may be unique and therefore not available in the target language. Natural languages pose additional difficulties because the rules governing language constructions are not always consistent.

Computer language conversion may face similar difficulties, although the computer implementation environment requires a greater level of rule consistency than is tolerable for natural languages. On the other hand—also because of the demands of the computer implementation environment—the representation in the target language must be fully compliant with the rules, grammar and syntax of the target language. Thus, if the target language does not contain structures that correspond to each of the structures of the source language a fully automated conversion may be difficult or even impossible.

Base SAS® (a runtime macro language and hereinafter defined, hereafter "SAS" or "Base SAS") is a proprietary software product sold under the registered trademark SAS® and owned by the SAS Institute Inc. It is widely used in the financial industry and elsewhere to organize and analyze data. It is marketed as a fourth-generation programming language (4GL) specially designed for data access, transformation and reporting. SAS provides support for Structured Query Language (SQL). Its language supports a "DATA step" for creating SAS dataset from various types of source files. Its language supports software procedures ("PROCs"), computer routines performing predefined data analysis, manipulation, and reporting functions. SAS programs are scripts which are interpreted and executed by Base SAS.

The task of converting scripts written in SAS into another language is problematic because these scripts embody features of the SAS Base language that are not readily convertible to a target language, at least not by conventional or prior art techniques, without significant manual reprogramming. Thus, it is not feasible within the prior art to execute SAS scripts except within a Base SAS computing environment. What is needed is an automated methodology and system for converting SAS scripts so that they may be executed within a computing environment other than Base SAS.

For the purposes of the present invention, the computing environment for addressing this market need is the JAVA environment. This environment includes JDBC layer, an implementation of the application program interface (API) for the JAVA programming language that defines how a client may access a database, and H2, the JAVA SQL database. JDBC is oriented toward relational databases (RDB) which are serviced by relational database management systems (RDBMS). The combination of techniques comprising the invention yield the desired result—JAVA programs that operate in the JAVA computing environment the same way as SAS scripts operate in the Base SAS environment. The inventors of the present invention make no claim that the same combination of techniques will achieve similar results in a computing environment other than JAVA or with respect to a language conversion from programs not written in Base SAS.

JAVA is very rich in its set of features and language constructions, so it is possible to map almost all SAS constructions to some natural JAVA equivalent. What is needed, however, is a methodology and system for handling those features of scripts written in Base SAS that do not appear to be convertible.

SUMMARY OF THE INVENTION

It is therefore an object of the present invention to provide a system and method for automatically converting script written in Base SAS to JAVA.

It is also an object of the invention to provide a conversion that does not require post-conversion editing or other manual intervention.

Yet another object of the invention is to overcome the incidence and impact of errors and time delay from manual conversion of SAS programs.

A further object of the invention is to reduce costs for legacy SAS code maintenance and support via conversion to a broadly supported language.

The name given to the invention as implemented so as to accomplish the foregoing objectives in an operable system is "Carolina".

Yet another object of this invention is to provide a system and method to read and write SAS data sets, SAS7BDAT files, directly from any JDBC-enabled JAVA application (hereinafter "JAVA application").

An aspect of the invention is a method for converting a SAS readable program to a JAVA readable program, by lexing and parsing. In the lexical phase the SAS readable program is analyzed into a stream of tokens, where one or more of the tokens are ambiguous. The stream of tokens are parsed to generate an abstract syntax tree (AST), using a context dependent parsing module adapted to SAS to resolve the ambiguous tokens. The AST is processed to identify JAVA objects and identify SAS specific constructs affecting program control. The AST is modified to express the control flow provided by SAS specific constructs in terms of JAVA program elements. The elements of the modified AST are traversed and matched to corresponding templates of JAVA code from a template library, and template parameters are filled from the corresponding elements, with the resulting code being put in an output file of a JAVA readable program.

In another aspect the invention provides a filter to identify SAS macros and replace the macros with corresponding SAS code in the SAS readable program. The context dependent parsing module includes a token filter to resolve ambiguous tokens and is adapted to resolve keywords that are not reserved, ambiguous language constructions, and Base SAS options that don't follow a pattern and that are not describable in Backus-Naur form.

Another aspect of the invention modifies a deterministic finite automaton (DFA) lexer to add an ambiguous token type used where the DFA lexer cannot determine a token type. Further, a part of the context dependent parsing module is a filter that is applied to the token stream to resolve keyword ambiguities and other ambiguous constructions by transformations that remove a token from the stream, change a type of a token, split a token into multiple tokens, merge tokens, and change the relative order of tokens. Lookup tables are created to resolve statement options by statement name, current statement, and option name. The modified AST is created by mapping SAS types to JAVA types, converting LINK statements to method calls, and by removing GOTO statements.

A further aspect of the system allows not only using SAS data sets in the context of a Base SAS program converted to JAVA, but also plugging into any third-party, JAVA-based application (operational system, like a rules engine, CRM, or other decisioning system) to enable these applications to read and write SAS7BDAT files directly.

An aspect of the invention is a computer implemented method for direct access by a JAVA application to a SAS dataset. The method provides on a computer system a driver that accesses a SAS dataset without going through a SAS system, enabling the driver to be operated by a JAVA application to read and write a SAS dataset directly. In a further aspect of the invention, the driver extracts header information from the SAS dataset and uses the header information to identify metadata information on pages within the SAS dataset that describes the data itself, and then uses the metadata information to return to the JAVA application a view of the SAS dataset as a database table.

A further aspect of the invention is the identification of what header information is necessary for practice of the invention, and the essential characteristics of a SAS dataset necessary for practice of the invention. The necessary header information is page size and page count, endianness, character set, and header length. The necessary knowledge is that a SAS dataset is characterized by: records of data, where all records have the same size; each record contains a value of a variable; variables can be of two types: character and numeric; and names of variables, together with labels, formats and informats associated with each variable, are identified in the metadata.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Computer language translation involves two separate steps. The first step breaks up an input stream of characters into a stream of vocabulary symbols (also called tokens or lexemes) for use by a parser. The software performing this step is often called the lexer or scanner. The second step takes the resulting token stream and builds an abstract syntax tree representing the program. The latter step is performed by a parser.

In modern computer languages, lexer and parser are two well defined steps. DFA (deterministic finite automata)-based lexers are sufficient for the first step. The program (part of the compiler/interpreter) that parses the source code of a context-free language can be automated using traditional parser generators such as YACC ("Yet Another Compiler Compiler"), which was written in C programming language, or some of its derivatives (e.g., bison), or more modern parser generators such as ANTLR ("Another Tool for Language Recognition") or JAVA C ("JAVA Compiler Compiler").

However, Base SAS as a language has features which distinguish it from modern languages (such as JAVA or C++) and which make parsing of the language very difficult. The well defined and sequential lexing and parsing steps that work for conventional computer languages do not work for SAS. The following are some of the inherent SAS language problems:

No reserved keywords.
The language is ambiguous; i.e., interpretation of language statements depends upon previous statements.
It cannot be described by context-free grammar or Backus-Naur form (BNF).
Embedded constructions such as X statements.
Advanced macro language and its interaction with run-time execution.
Context sensitive lexing.
These difficulties with the SAS language will be summarized below.

Keywords are not Reserved

The Base SAS language allows the use of any name as an identifier, including words that in other places have a specific semantic meaning. In this respect it is similar to the PL/1 language and, as with the latter, it allows constructions such as this famous example:

if then=else then else=if else then=if;

The first "then" is a variable. The second "then" is a keyword indicating the then clause of the if statement. We describe below the technique we use to resolve which tokens are keywords and which are variable names.

Ambiguous Constructions

Here are listed some examples of ambiguous language constructions:

Example 1

Input +1;
Interpretations:
1 increment variable named input by one, or
2 in the input buffer, move to the next column.

If there is no variable named "Input", SAS chooses the second meaning.

Example 2

ARRAY NOT(2); *describes an array of two elements
A=not(2);
Interpretations:
1 apply logical operation not to number 2
2 takes the second element of array not.

Lack of Context-Free Grammar to Describe the Language

Many Base SAS options allow further options. These options do not follow any regular pattern and can not be described using BNF.

Embedded Constructions

The SAS X statement allows operating system commands to be written within the SAS program for execution during program interpretation.

Interaction of MACRO Language with Run-Time Execution.

Base SAS does not allow:
1. user defined functions or subroutines.
2. conditional logic or loops across multiple DATA steps and PROCs.
3. sharing variables across DATA steps or PROCs.

To solve these problems, SAS introduced a macro language. Compared with C/C++, the macro language SAS MACRO has a unique feature: it can interact with SAS runtime. By using this feature (or, more appropriately, misusing it) it is possible to write a program where the generated code depends on the input data. In this application the term "runtime macro language" or "RML" will be used to refer to a language having this macro feature and "runtime macro language scripts" or "RML scripts" or "RML readable programs" will be used to refer to programs written in RML.

EXAMPLE

DATA_NULL_;
INFILE 'PROGRAM.TXT';
INPUT CODE $;
CALL SYMPUT ('CODE',CODE);
RUN;
DATA_NULL_;
X=&CODE;
PUT X=;
RUN;

The file PROGRAM.TXT consists of the single line:
1+2+9;

The result of executing the second DATA step would be to assign twelve to the program variable X. This type of program is impossible to convert into JAVA (or any other language, for the same reason) because the code to be executed is not known at the moment of compilation.

Context-Sensitive Lexing

Example 1

Let's compare two statements.
DATA date9.a;
and
INPUT a date9. b;

In the first statement, "date9" and the dot (".") are two separate tokens. Date9 stands for the library name and the dot separates the library name from the dataset name. In the second statement "date9." is a single token indicating the SAS format used to input variable "a". A DFA based lexer can not distinguish between these two cases.

Example 2 put (K –L, DATE9. –L)

The first L stands for a variable named L and means that we need to subtract L from K. The second L is actually a part of the token "–L" to indicate that the resulting value should be left-aligned.

In the detailed description that follows we describe our approach to solving these issues.

Figure 1:
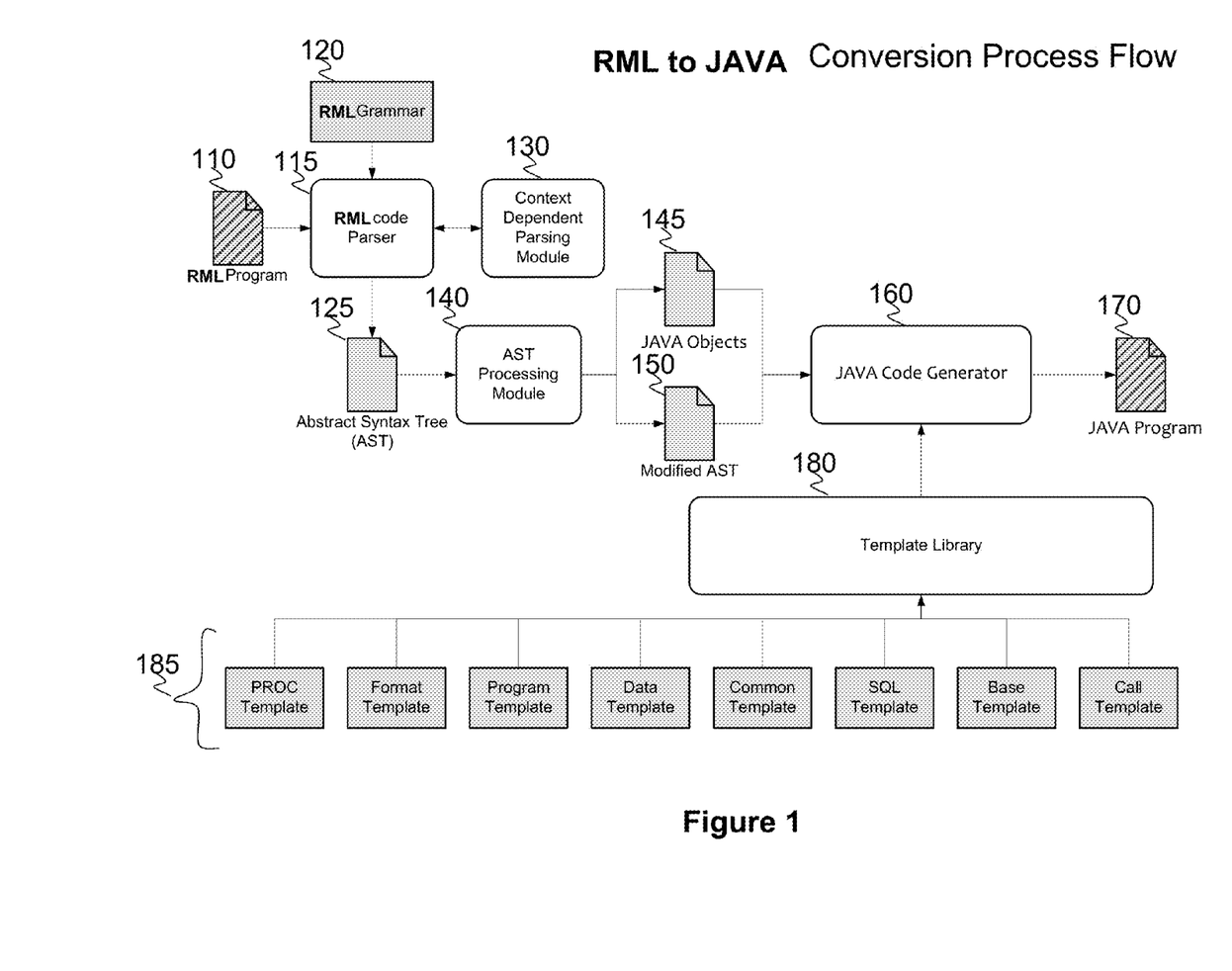
FIG. 1 is a flow diagram of the SAS to JAVA conversion process.

The general process flow of SAS to JAVA conversion is presented on FIG. 1. First, a SAS program 110 is processed by a SAS code Parser 115. The parser 115 utilizes an implementation of the SAS grammar 120 and outputs an Abstract Syntax Tree (AST) 125. Since SAS syntax can not be represented by a context independent grammar, SAS code parser 115 interacts with the Context Dependant Parsing Module 130 to resolve ambiguities.

The next step is to process 140 the AST itself and identify JAVA objects 145 that need to be defined in the final output JAVA program 170. In addition, SAS specific constructs, like LINK and GOTO are identified and AST 125 is modified 150 to express the control flow of the SAS program 110 with the elements of JAVA language.

Finally the modified AST 150 is used to generate 160 the output JAVA program 170. For each element of the modified AST 150 there is a corresponding template 185 in the Template Library 180. A template 185 is a skeleton JAVA code that implements an element of the modified AST 150. The JAVA Code Generator 160 traverses the modified AST 150, and for each element selects a template 185, fills it in with the corresponding parameters and places the resulting JAVA code into the output JAVA program file 170.

Figure 2:
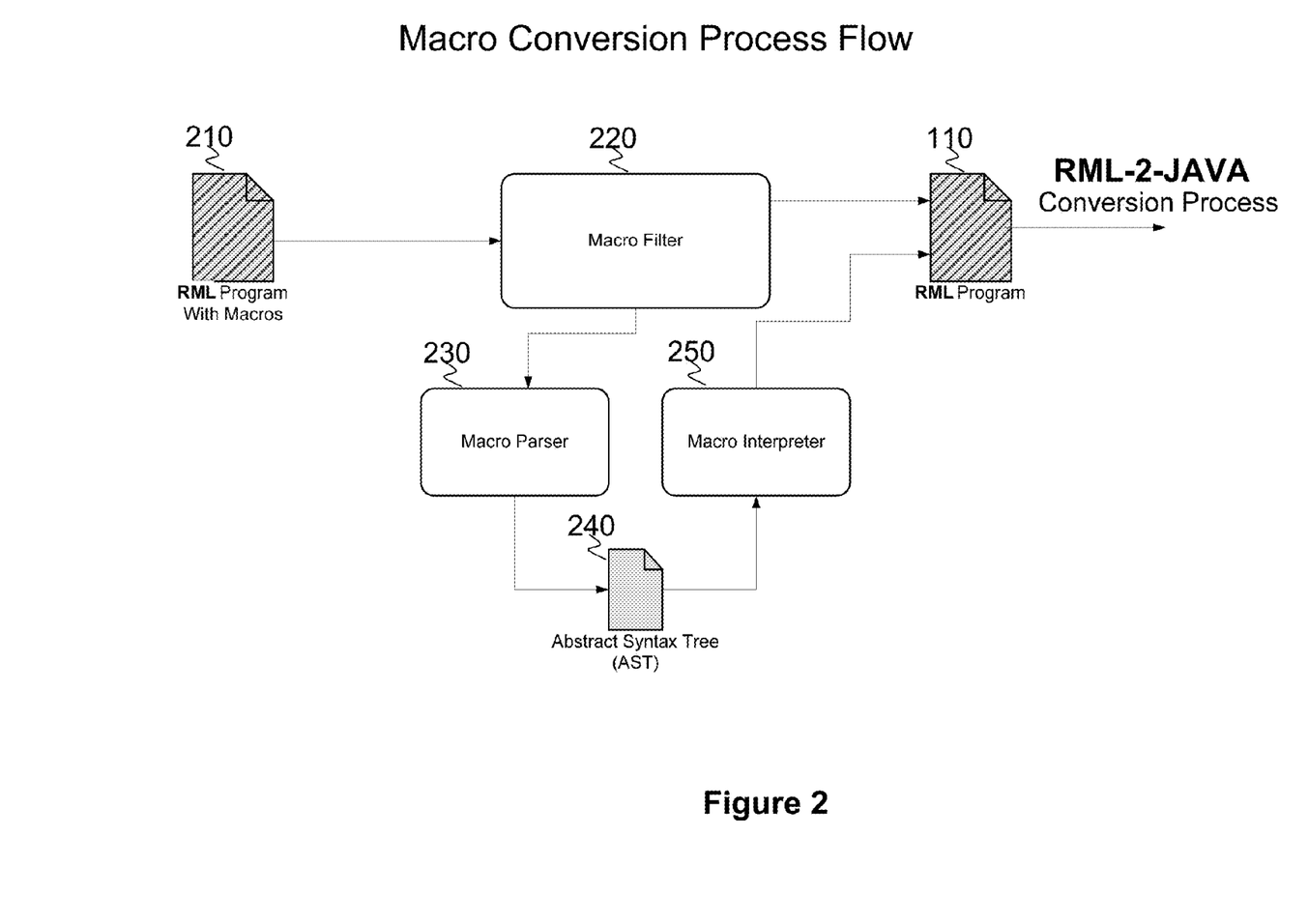
FIG. 2 is a flow diagram of the SAS macro conversion process.

Turning now to FIG. 2, if the original SAS program 210 contains SAS Macros, an additional pre-processing step is required before SAS-to-JAVA conversion can be accomplished. The original SAS program 210 is processed by a Macro Filter Module 220. If a Macro is detected it is first parsed by a specialized Macro Parser 230 into macro AST 240. Then the macro is executed by a Macro interpreter 250 and a corresponding SAS code is generated and added to the SAS program file 110. After that the output SAS program 110 is converted to JAVA as described above.

Figure 3:
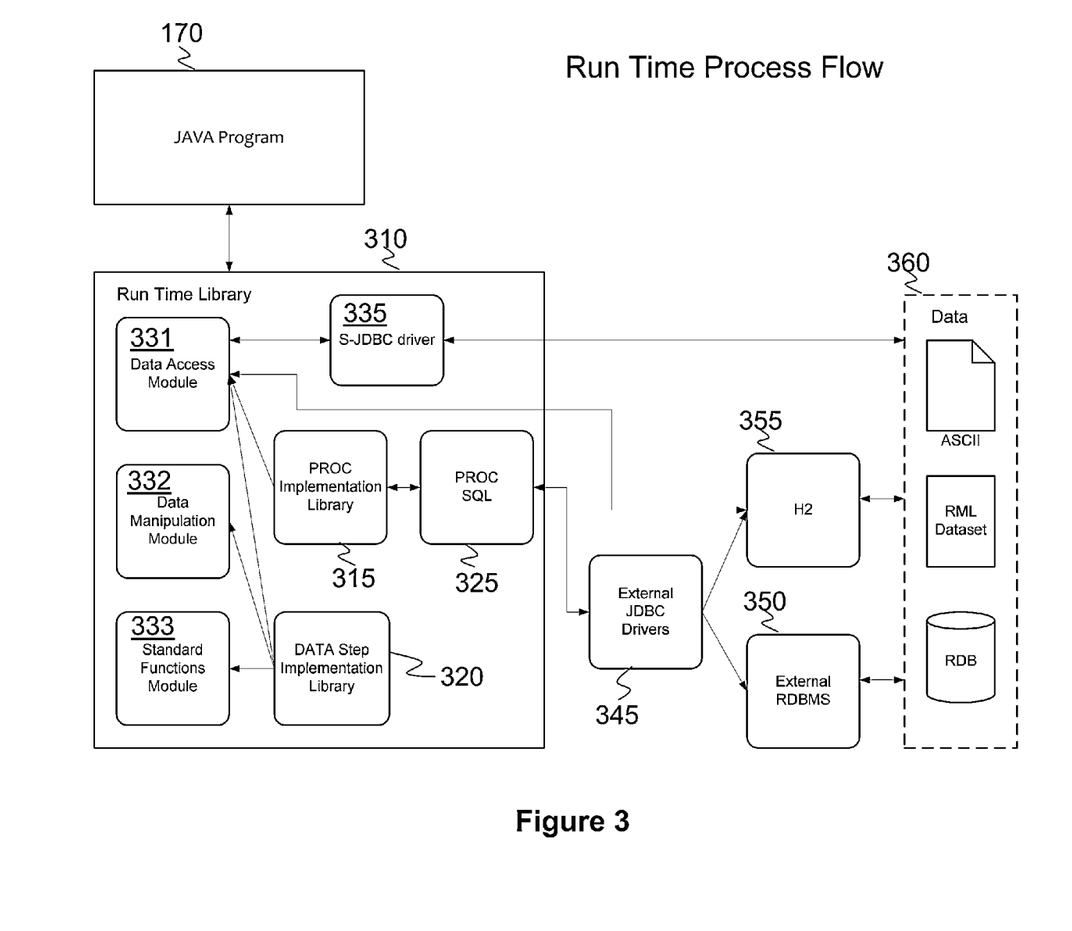
FIG. 3 is a flow diagram of the run time process for execution of the converted JAVA program.

During the execution of the converted SAS program by Carolina, a Run-Time library 310 is required as shown in FIG. 3. The Run-Time Library 310 contains JAVA classes that implement SAS PROCs as well as certain statements of the SAS Data Step 360. In turn, PROC Implementation Library 315 and DATA Step Implementation Library 320 both utilize lower level functionality of the Data Access 331, Data Manipulation 332 and Standard Function Module 333. PROC SQL 325 implementation contains specialized code that direct SQL statements through external JDBC drivers 345 either directly to the external RDBMS 350 or to the H2 database 355 that is used to implement SAS built-in data manipulation capabilities.

For the purposes of the present invention, the code in the Carolina Run Time library 310 that directly accesses SAS data step 360 can be aggregated in the form of a driver 335 (called "S-JDBC") that can also be used by any JDBC-enabled JAVA application (not simply a JAVA program 170 generated by Carolina) to obtain direct access to SAS datasets, as described below under the heading "Direct Access Driver" and in connection with FIG. 4A and FIG. 5.

Lexing and Parsing
Lexer

The lexer is actually implemented in two steps. The first step resembles DFA based languages for JAVA or C++. In addition to the usual tokens, such as identifiers or numbers, we introduce a special token type: an ambiguous token where the lexer can not determine the token type. This token stream is then sent through a set of token filters.

Token Filters

A filter takes a raw stream of tokens created by the lexer and analyzes each one by looking at the surrounding tokens. The filter can remove tokens, change tokens types, split a token into multiple tokens, merge tokens, and change their relative order. Token filters use a set of heuristics to resolve keywords, and are included in Context Dependent Parsing Module 130.

Listed below are some of the transformations performed by these filters:

f1 Add special boundary tokens at the end of each DATA and PROC step.
f2 Some of the PROCs are not actually terminated by RUN statements but rather by QUIT statements. For such PROCs the filter removes intermediate RUN statements and replaces the QUIT statement with a RUN statement.
f3 Splits "numbered" tokens such as TITLE2 into a sequence of two tokens;
  Before: TITLE2
  After: TITLE 2.
f4 For Lag and Diff functions it also rearranges the set of tokens;
  Before: LAG10 (x)
  After: LAG (10, x)
f5 put function can accept an argument alignment put (x, 2. −L)
f6 Keyword recognition
f7 Option recognition
SAS has a very irregular set of rules for statement options. For example:
  so1 np—no parameter; i.e., Boolean option
  so2 lines=3—takes integer parameters
  so3 axis=1 to 3—takes from, to, by expression as parameters
  so4 list=(1, 2, 3)—parenthesized list, comma separated
  so5 list=1 2 3—list without parenthesis, space separated
To distinguish different options, we create a large set of lookup tables. The resolution mechanism depends on the name of the PROC step (or DATA step), current statement and option name. With the guidance provided by this disclosure, these lookup tables may be created by one skilled in the art.

NOTE: In cases f3 and f4 the newly created tokens 2 and 10 are assigned a special type INT to distinguish between these statements TITLE 2; and TITLE2;

Parsing

The filtering process removes all irregularities from the original SAS language, and the resulting token stream can be described using context-free grammar. We use the ANTLR parser to build the syntax tree.

Base SAS is actually a combination of four languages in one (or five with the macro language)
  DATA step
  PROC FORMAT
  PROC SQL
  PROC, all other Each of the languages is described by its own grammar file. All of these grammars are derived from the common grammar that describes a set of elements shared between all grammars.

Java Code Generation
Tree Manipulation

After the pairing tree is built we need to perform the following tasks before we can start one-to-one mapping between syntax constructions:
  Type assignment.
  Convert LINK statements to method calls.
  GOTO elimination.

Type Assignment

The JAVA language is a strongly typed language, i.e., each variable should be declared before its use with an explicit type specification. The SAS language allows variables to be created on demand, and the type is assigned based on the first use.

Below we list the mapping between SAS and JAVA types:

| SAS type | JAVA type |
| --- | --- |
| NUMERIC | double |
| CHARACTER | String |
| ARRAY NUMERIC | double [ ] (or multidimensional array) |
| ARRAY CHARACTER | String [ ] (or multidimensional array) |
| Input dataset (from set or merge statement) | InputDataSet * |
| Output dataset (from DATA statement) | OutputDataset * |

SAS strings are fixed-size strings where the size of the string is determined during program compilation (or first use). JAVA does not have a fixed size string. Instead of creating JAVA class FixedSizeString to better represent a fixed size string we instead rely on JAVA strings.

To match SAS functionality, it would be necessary to expand or truncate a string variable every time a new value is assigned to the string variable, in order to fit the predetermined size. In many cases this operation is redundant and just leads to program slowdown, so Carolina ignores it.

Name Clash and Case Sensitivity.

SAS variable names and data set names are case insensitive. JAVA variables are case sensitive. When replacing case insensitive with case sensitive language we have three choices:
  1 convert all variables to upper case;
  2 convert all variables to lower case; or,
  3 convert all variables to the same case based on the first occurrence.

For variable names we choose the third approach.

The SAS language has two levels of namespaces for an object: the local namespace at the level of the DATA step, which includes variable names and temporary arrays, and the three global namespaces for formats, library names and filenames. The same name can be used as a variable name, format name and library name without conflict.

In the resulting JAVA program we have the same two levels of namespaces. Global objects would be converted to data members of the main class. Variables and array names would be mapped to data members of anonymous classes There is a possibility of conflict where the symbol name at the DATA step level clashes with a global object. According to the JAVA rule, the name in the internal scope hides the name in the outer scope and it becomes inaccessible.

For the global variables the three namespaces are mapped to a single JAVA namespace and there is the possibility of a name clash; for example, a format having the same name as a library name.

To resolve this clash we use the following solution: format names are capitalized and filenames are converted to lower case. Then we analyze both global tables for possible name clash. If there is one, we try to change the capitalization to create a unique name.

Run-Time Library

The Carolina Run-time Library is an integral part of the Carolina run-time environment. It contains compiled JAVA code for the SAS DATA step implicit loop implementation. It also contains implementations for standard SAS statements that do not have natural counterparts in JAVA language such as SET, INFILE and many others.

Of course, this JAVA code could be generated anew each time Carolina converts a SAS program into JAVA. In that case there would be no need for an associated run-time library, inasmuch as all code including implicit loop implementation could be compiled and then executed. However, the drawback to this approach is two-fold: it a) mandates an overlarge amount of JAVA code to maintain, and b) imposes additional processing time in order to compile the generated JAVA code.

For these reasons, the standard Carolina approach and distribution includes a Run-time Library.

Direct Access Driver

JDBC (JAVA Database Connectivity) is a programming standard or application program interface (API) designed to allow JAVA programs to access data from various data sources, including RDMBs (relation database management systems). Development of the JDBC standard made sense because the various data sources use many of the same access conventions. Prior to the JDBC standard, a JAVA application would have to use the run-time libraries of each of the different data sources required by the JAVA application, which meant that the JAVA application had to comply with the data access requirements of each of these run-time libraries.

After development of the JDBC standard, different database vendors usually provide JAVA libraries that implement this API via so called JDBC drivers. A database vendor complying with the standard will make available a JDBC driver that uses the standard for data access requirements covered by the standard, and then also includes additional driver code to cover those data access requirements which the database vendor handles in a different way, not covered by the standard.

To use such a driver a JAVA application should comply with the JDBC standard, that is, be "JDBC-enabled". An advantage of using the JDBC standard is that a JDBC-enabled application can have a single branch of code that provides data access by making JDBC-compliant calls. This is an efficient mechanism because these JDBC-compliant calls handle in a single branch of code the majority of data access requirements across the many different database vendors. The JAVA application can then more easily deal with the remaining data access requirements, which are idiosyncratic to the particular database vendor. Because the majority of all data access requirements across all database vendors can then be handled by the same single branch of code, the JAVA application can more efficiently use multiple JDBC drivers to provide access to the corresponding data sources, both JDBC compliant access as well as the respective differences that are idiosyncratic to the particular data sources.

Typically, a JDBC driver accesses data directly, using database specific libraries that are part of the driver. For example the ASCII text file JDBC driver 446 shown in FIG. 4B implements that process flow from JDBC-enabled JAVA application 410 to ASCII text file 466. As shown in FIG. 4C, the JDBC driver 491 provided by SAS allows JDBC-enabled JAVA application 410 to use SAS dataset 461, but it works by using an intermediate application server 490 (also provided by SAS) which actually processes the file and sends information to the SAS JDBC driver 491 using a remote protocol.

This invention does not rely on any third party software. It processes the SAS datasets without any intermediate layer and/or process. This is the main differentiator from the prior art.

Carolina S-JDBC is an enterprise software utility, implemented as a JDBC driver, that allows the direct reading and writing of proprietary-format SAS datasets. S-JDBC may be invoked programmatically by any third-party, JDBC enabled JAVA application. S-JDBC allows users to import any data element that resides in a legacy SAS warehouse or file set, much as other industry standard JDBC utility permits data integration. Upon completion of the job, S-JDBC allows the data to be reloaded into the SAS data facility. No SAS licenses or technology is required.

With Carolina S-JDBC, therefore, users can eliminate the costly data transformation and loading procedures now in place to populate their third-party applications with data that is manipulated or maintained in a separate SAS environment. S-JDBC operationalizes SAS datasets.

Figure 4A:
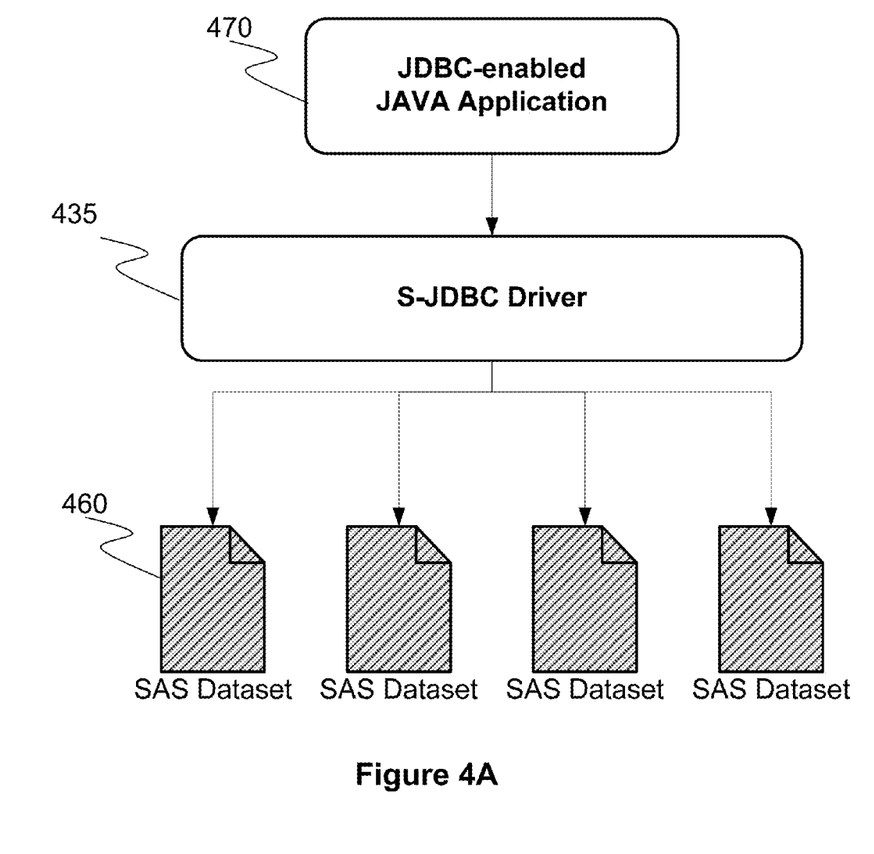
FIG. 4A is a flow diagram showing direct access from a JAVA application to a SAS dataset using a driver adapted to SAS.
Figure 4B:
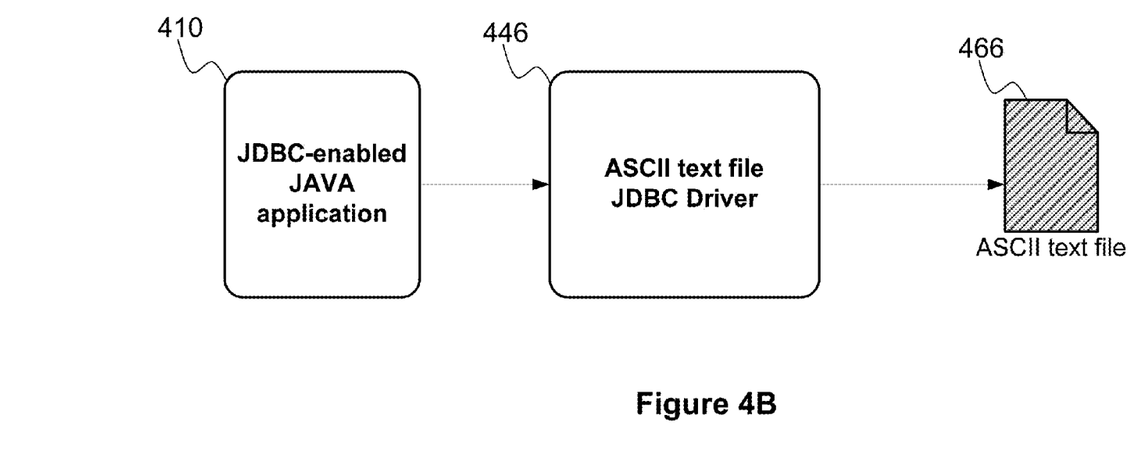
FIG. 4B is a flow diagram showing an exemplar prior art use of a JDBC driver to achieve direct access from a JDBC-enabled JAVA application to data stored by a particular database program.
Figure 4C:
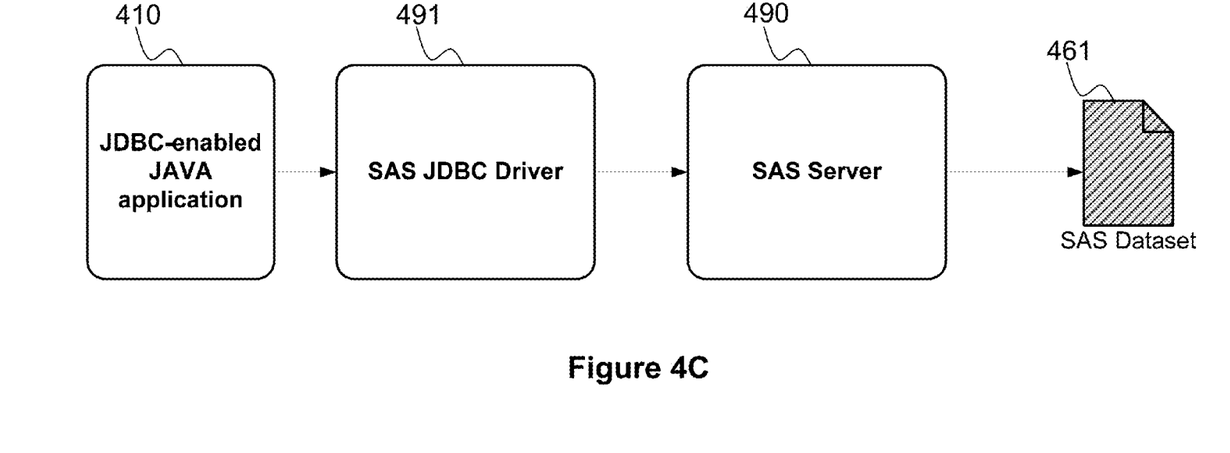
FIG. 4C is a flow diagram showing prior art access from a JDBC-enabled JAVA application to a SAS dataset using a SAS JDBC driver operating through a SAS server.

Direct access from a JAVA application 470 to a SAS dataset 460 is provided by a driver 435 (the Carolina S-JDBC), as shown schematically in FIG. 4A. In this invention the system that provides reading and writing of SAS data sets is a particular implementation of the JDBC API. JDBC is an API initially designed to allow JAVA programs to access data from RDMBs (relational database management systems). Different database vendors usually provide implementation of this API as a JAVA library. The same API—with some restrictions—is normally used to access data not only from an RDMS but also from local files on the computer, for example comma separated text files.

However, no such driver is currently available for direct access from a JAVA application to a SAS dataset. Instead, access is obtained indirectly through a SAS server. The invention adapts its understanding of the structure of a SAS dataset to produce a driver that JAVA applications can use directly—without the SAS proprietary products as an intermediary—to access SAS datasets.

Figure 5:
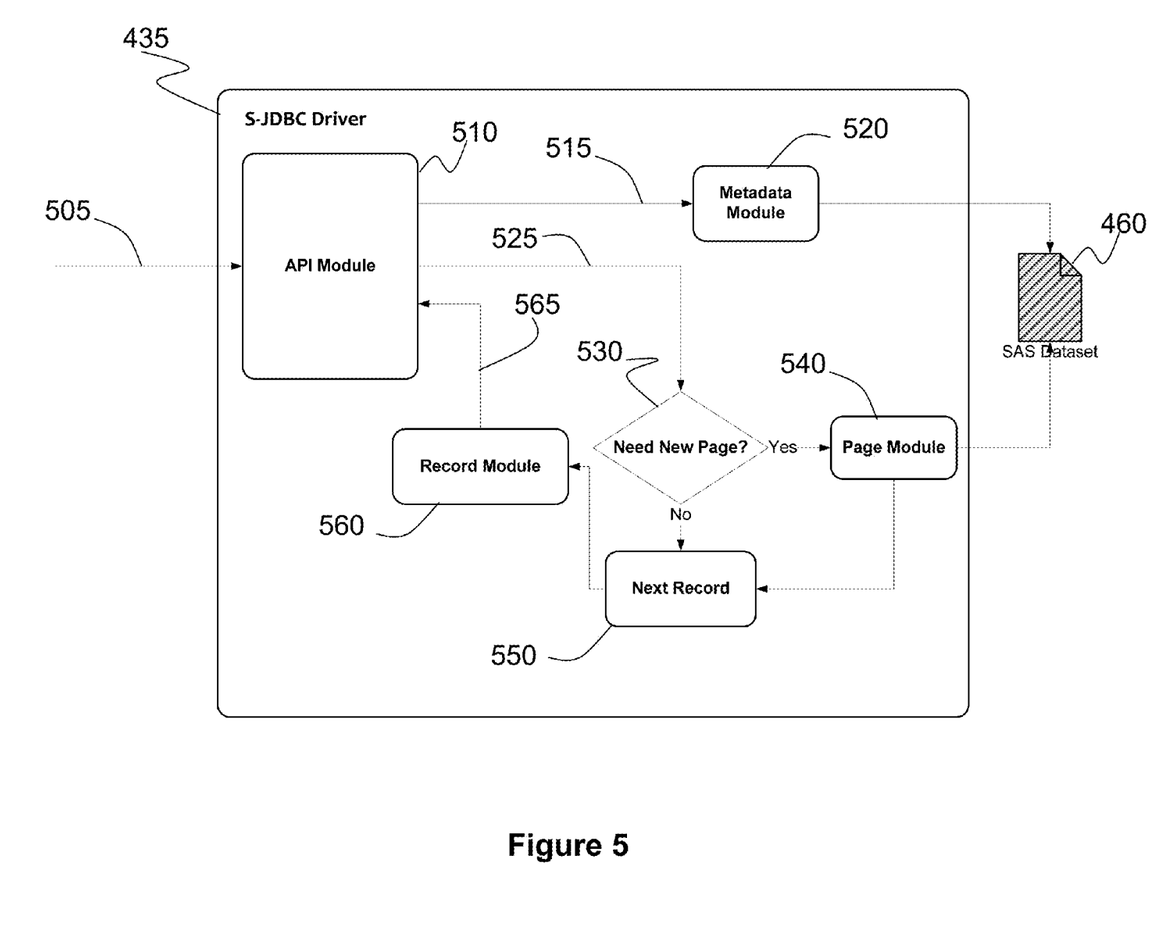
FIG. 5 is a flow diagram showing operation of the driver for direct access to a SAS dataset.

The process flow of the invention's SAS JDBC (S-JDBC) driver 445 is presented on FIG. 5. As shown, the driver 445 processes the SAS dataset 460 (SAS7BDAT files) directly, without any intermediate layer or process. This is one of the important features of the current invention.

A request 505 to read or write a data set 460 comes from a JAVA application 470. First the application 470 opens a connection via a corresponding JDBC API call (getConnection). In the present invention, the file system directories are mapped to database schema and SAS7BDAT files are mapped as tables (similar to PROC SQL in SAS software). After the connection call completes, the SAS dataset 460 is viewed by the application 470 as a database table and the application 470 can now send SELECT and INSERT requests to read or write the data in the SAS dataset 460.

The S-JDBC driver works with five data types, two original SAS data types (NUMERIC and CHARACTER) and three derived data types (mapped to JDBC types: DATE; TIME; and TIMESTAMP) The mapping is determined by the optional format, where "optional format" is a term known to those familiar with SAS.

When a getConnection request 505 from the application comes in, it is first processed by the API module 510, which performs parsing and extracts the parameters of the call. Then the parameters are passed as a metadata request 515 over to the Metadata Module 520.

Figure 6:
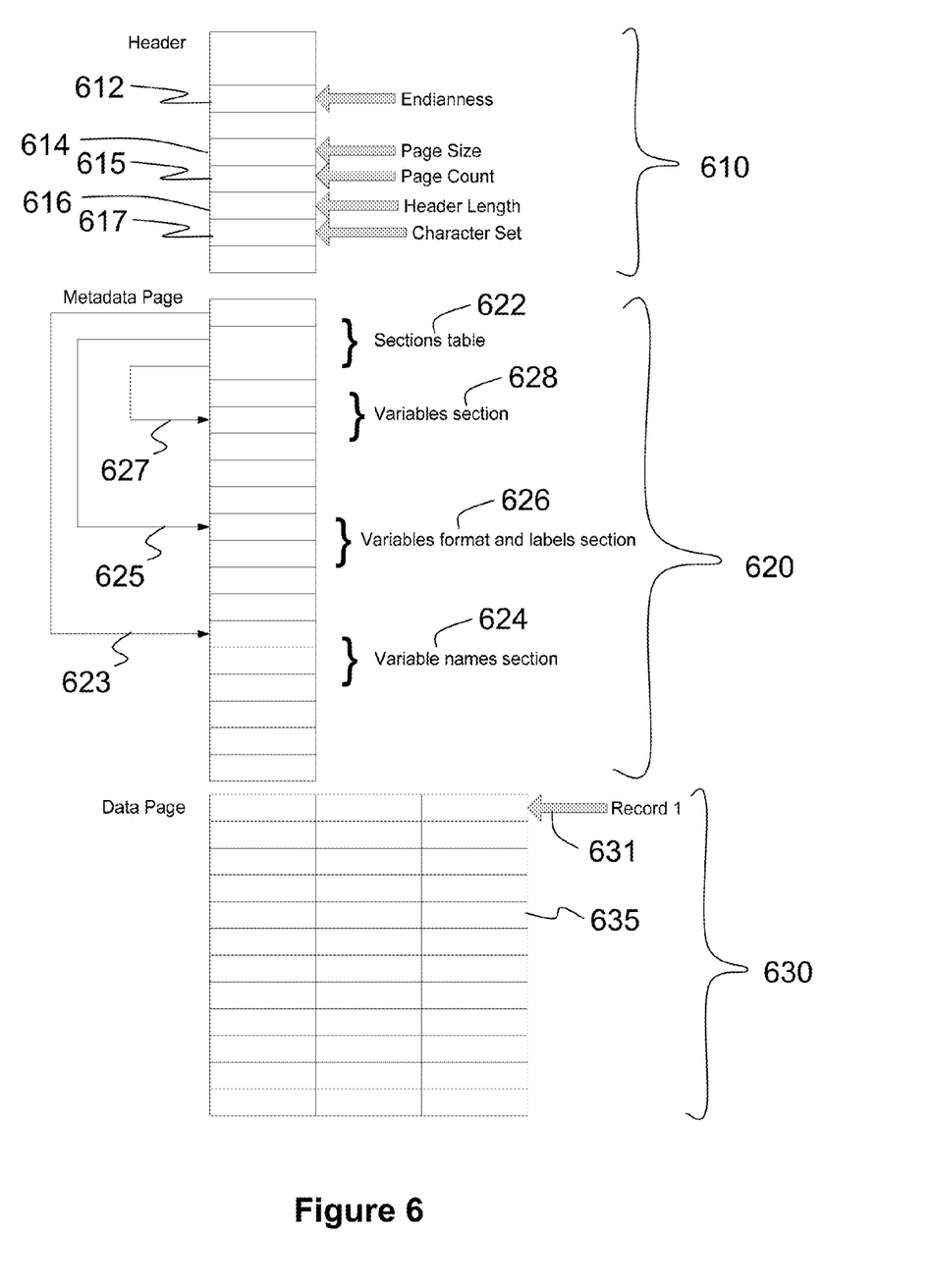
FIG. 6 is schematic representation of the structure of a SAS dataset.

Internally, SAS7BDAT files (e.g. SAS dataset 460) have a structure for storing data. Data is stored in pages that all have the same size. The first page is a header page, which is followed by one or more metadata pages, and then the data pages. Each data page contains a certain number of data records, and all data records have the same size.

FIG. 6 is schematic representation of a SAS dataset structure, comprised of a header 610, a metadata page 620 and data page 630. SAS datasets store data in logical pages (e.g. data page 630 in FIG. 6) that all have the same size. Each page contains a certain number of data records; all records (e.g. 631 and 635) have the same size. The Metadata Module 520 accesses the SAS7BDAT file 460 and reads the following information from the file header 610:
  Page size 614 and page count 615
  Endianness 612 (i.e. the byte order, in terms of significance)
  Character set 617
  Header length 616.

This information allows the Metadata Module 520 to access Metadata Page 620, which contains several sections. At the beginning of the Metadata Page 620 there is a Sections table 622 that contains offsets (pointers 623, 625 and 627) to the individual sections (624, 626 and 628) on the Metadata Page.

The Metadata sections contain the following information:
  Variable names section 624 (pointed to by offset 623): the name of each variable;
  Variable format and labels section 626 (pointed to by offset 625): SAS specific information not needed to access the data, such as formats and informats (i.e. instructions that SAS uses to read data values into a variable) associated with each variable;
  Variables section 628 (pointed to by offset 627): list of variable sizes and types;
Each section also contains information about the section size.

The Metadata Module 520 reads the metadata information described above. Then the driver 435 returns back to the application and allows it to request the specific metadata information or continues with data (read/write) requests.

The foregoing information and the schematic representation of FIG. 6 enables one skilled in the art to develop Metadata Module 520.

When a read/write request 505 comes in the driver 435 needs to access the specific record in the SAS dataset 460 identified by the request. After processing by the API module 510, data request 525 is used to determine 530 if the requested record is on the current page. (That is never the case for the first data request). If the record is not on the current page the request is made to the Page Module 540 to load the corresponding page. The Page Module 540 then reads the page specific metadata information from the SAS dataset 460,
  Page type
  Start of the page data section
  Deleted records bitmap
  Number of records on the page,
and prepares the page for access and passes it over to the Record Module 560. Finally the Record Module 560 accesses the individual record 550 that has been loaded and performs the requested read or write operation via the Page Module 540. The resulting data response 565 is then returned back to the calling JAVA application via the API Module 510.

While the invention has been described in terms of preferred embodiments, those skilled in the art will recognize that the invention can be practiced with modification within the spirit and scope of the appended claims.

Having thus described my invention, what I claim as new and desire to secure by Letters Patent is as follows:

1. A computer implemented method for direct access by a JAVA application to a SAS dataset, comprising:
  providing on a computer system a driver that accesses a SAS dataset, further comprising:
  extracting from said SAS dataset header information;
  using said header information to identify metadata information regarding data in said SAS dataset; and
  returning to said JAVA application a view of the SAS dataset as a database table, and
  enabling said driver to be operated by said JAVA application directly, without going through a SAS system, to read and write said SAS dataset, wherein said driver and said JAVA application comply with JAVA Database Connectivity (JDBC) standard, said JAVA application thereby being JDBC enabled.

2. A method as in claim 1, further comprising:
  receiving from the JAVA application requests to read or write data in the database table; and
  using said metadata information to apply said read or write requests to said SAS dataset.

3. A method as in claim 2, wherein said header information comprises:
  page size and page count;
  endianness;
  character set; and
  header length.

4. A method as in claim 3, wherein said SAS dataset is characterized by records of data, where all records have the same size;
  each said record contains a value of a variable;
  variables can be of two types: character and numeric; and
  names of variables, together with labels, formats and informats associated with each variable, are identified in the metadata.

5. A method as in claim 2, wherein applying read or write requests to the SAS dataset further comprises:
  determining if a new page is needed from the SAS dataset;
  retrieving a new page, if needed;
  retrieving a requested record; and
  writing the retrieved record, if requested.

6. A method as in claim 1, further comprising:
  receiving from the JAVA application a request for metadata information; and
  returning to the JAVA application said metadata information.

7. A computer implemented system for direct access by a JAVA application to a SAS dataset, comprising:
  a processor operable on a computer to execute instructions, wherein said driver instructions extract from said SAS dataset header information, use said header information to identify metadata information regarding data in said SAS dataset, and return to said JAVA application a view of the SAS dataset as a database table; and
  a driver that accesses a SAS dataset directly via instructions executable by the processor, without going through a SAS system, to read and write said SAS dataset, wherein said driver and said JAVA application comply with JAVA Database Connectivity (JDBC) standard, said JAVA application thereby being JDBC enabled.

8. A system as in claim 7, wherein said driver receives from the JAVA application requests to read or write data in the database table, and uses said metadata information to read or write to the SAS dataset as requested.

9. A system as in claim 8, wherein said header information comprises:
   page size and page count;
   endianness;
   character set; and
   header length.

10. A system as in claim 9, wherein said SAS dataset is characterized by records of data, where all records have the same size;
   each said record contains a value of a variable;
   variables can be of two types: character and numeric; and
   names of variables, together with labels, formats and informats associated with each variable, are identified in the metadata.

11. A method as in claim 8, wherein the driver determines if a new page is needed from the SAS dataset, retrieves a new page, if needed, retrieves a requested record, and writes the retrieved record, if requested.

12. A system as in claim 7, wherein the driver receives from the JAVA application a request for metadata information and returns to the JAVA application said metadata information.

13. A computer implemented system for direct access by a JDBC-enabled JAVA application to a SAS dataset, the computer system having software instructions stored thereon and having a processor operable to execute the software instructions, comprising:
   computer code comprised of software instructions for accessing a SAS dataset directly, without going through a SAS system, to read and write said SAS dataset, wherein said computer code and said JAVA application comply with JAVA Database Connectivity (JDBC) standard, said JAVA application thereby being JDBC enabled;
   second computer code that extracts from the SAS dataset header information;
   third computer code that uses the header information to identify metadata information regarding data in the SAS dataset; and
   fourth computer code that returns to the JAVA application a view of the SAS dataset as a database table.

14. A system as in claim 13, wherein said computer code further comprises:
   fifth computer code that receives from the JAVA application requests to read or write data in the database table; and
   sixth computer code that uses said metadata information to apply said read or write requests to the SAS dataset.

* * * * *